United States Patent
Huang

(10) Patent No.: US 9,735,919 B2
(45) Date of Patent: Aug. 15, 2017

(54) UPDATES TO MU-MIMO RATE ADAPTATION ALGORITHM

(71) Applicant: QUALCOMM Incorporated, San Diego, CA (US)

(72) Inventor: Xiaolong Huang, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/539,721

(22) Filed: Nov. 12, 2014

(65) Prior Publication Data

US 2015/0326340 A1 Nov. 12, 2015

Related U.S. Application Data

(60) Provisional application No. 61/991,329, filed on May 9, 2014.

(51) Int. Cl.
| | |
|---|---|
| *H04B 7/04* | (2017.01) |
| *H04L 1/00* | (2006.01) |
| *H04B 7/0452* | (2017.01) |
| *H04B 7/0456* | (2017.01) |
| *H04B 7/0413* | (2017.01) |
| *H04L 25/02* | (2006.01) |

(52) U.S. Cl.
CPC ........... *H04L 1/0009* (2013.01); *H04B 7/043* (2013.01); *H04B 7/0413* (2013.01); *H04B 7/0452* (2013.01); *H04B 7/0456* (2013.01); *H04L 1/0003* (2013.01); *H04L 1/0026* (2013.01); *H04L 25/0206* (2013.01); *H04L 25/0222* (2013.01); *H04L 25/0228* (2013.01); *H04L 25/0242* (2013.01)

(58) Field of Classification Search
CPC .............................. H04B 7/0632; H04B 7/063
USPC ......................................... 375/259, 260, 267
See application file for complete search history.

(56) References Cited

U.S. PATENT DOCUMENTS

| | | | |
|---|---|---|---|
| 8,190,092 B1 | 5/2012 | Lee | |
| 2005/0243942 A1 | 11/2005 | Sawai | |
| 2006/0193294 A1* | 8/2006 | Jorswieck et al. | ............ 370/334 |
| 2007/0165736 A1 | 7/2007 | Wang et al. | |

(Continued)

FOREIGN PATENT DOCUMENTS

| | | |
|---|---|---|
| CN | 103427885 A | 12/2013 |
| WO | WO-2013081430 A1 | 6/2013 |

OTHER PUBLICATIONS

Partial International Search Report—PCT/US2015/027667—ISA/EPO—Jul. 16, 2015.

(Continued)

*Primary Examiner* — Kevin M Burd
(74) *Attorney, Agent, or Firm* — Paradice and Li LLP

(57) ABSTRACT

A method of selecting a modulation coding scheme (MCS) for transmitting data to a client station (STA). The communications device first predicts the MCS for each of at least two of a plurality of communication modes. The plurality of communication modes may include an open-loop mode and at least one of a single-user multiple-input multiple-output (SU-MIMO) mode or a multiple-user multiple-input multiple-output (MU-MIMO) mode. The communications device then selects one of the plurality of communication modes for transmitting data to the STA based at least in part on the predicted MCSs.

30 Claims, 12 Drawing Sheets

(56) References Cited

U.S. PATENT DOCUMENTS

| | | | |
|---|---|---|---|
| 2009/0010355 A1 | 1/2009 | Mori et al. | |
| 2010/0067401 A1 | 3/2010 | Medvedev et al. | |
| 2010/0232525 A1 | 9/2010 | Xia et al. | |
| 2010/0266060 A1* | 10/2010 | Kimura et al. | 375/267 |
| 2011/0051835 A1 | 3/2011 | Yuan et al. | |
| 2011/0237283 A1* | 9/2011 | Shan et al. | 455/509 |
| 2012/0063336 A1 | 3/2012 | Shany et al. | |
| 2013/0094380 A1* | 4/2013 | Taoka | H04B 7/0417 370/252 |
| 2013/0188630 A1 | 7/2013 | Song et al. | |
| 2013/0201862 A1* | 8/2013 | Cui et al. | 370/252 |
| 2013/0235836 A1 | 9/2013 | Roh et al. | |
| 2013/0263201 A1 | 10/2013 | Chung-How et al. | |
| 2013/0287132 A1* | 10/2013 | Taoka | H04B 7/0452 375/267 |
| 2014/0029454 A1* | 1/2014 | Yu et al. | 370/252 |
| 2014/0071838 A1 | 3/2014 | Jia et al. | |
| 2014/0219110 A1 | 8/2014 | Du et al. | |
| 2014/0219111 A1 | 8/2014 | Du et al. | |
| 2014/0254648 A1* | 9/2014 | Van Nee | 375/224 |
| 2014/0269964 A1 | 9/2014 | Du et al. | |
| 2015/0326339 A1 | 11/2015 | Huang | |
| 2016/0036572 A1 | 2/2016 | Bhanage et al. | |
| 2017/0034815 A1* | 2/2017 | Lunttila | H04L 5/0007 |

OTHER PUBLICATIONS

International Search Report and Written Opinion—PCT/US2015/027667—ISA/EPO—Sep. 28, 2015.

\* cited by examiner

UPDATES TO MU-MIMO RATE ADAPTATION ALGORITHM

RELATED APPLICATIONS

This application claims priority under 35 U.S.C. §119(e) of the co-pending and commonly-owned U.S. Provisional Patent Application No. 61/991,329, titled "Updates to MU-MIMO Rate Adaptation Algorithm," filed May 9, 2014 and is hereby incorporated by reference in its entirety.

TECHNICAL FIELD

The present embodiments relate generally to wireless communications systems, and specifically to methods of rate adaptation in multi-user multiple-input multiple-output environments.

BACKGROUND OF RELATED ART

Multiple-input multiple-output (MIMO) wireless communications techniques are used in local area networks (LANs) and 4G cellular networks to enable an access point (AP) to transmit multiple streams of data, concurrently, to a client or user station (STA). MIMO communications offer many advantages over conventional communications techniques, including, for example, high capacity, extended coverage, increased diversity, and/or interference suppression. As a result, multi-user MIMO (MU-MIMO) has emerged as an important feature of next-generation wireless networks. MU-MIMO has the potential to combine the high capacity of MIMO processing with the benefits of space-division multiple access (SDMA).

MU-MIMO communications techniques are described, e.g., in the IEEE 802.11ac specification. In brief, data streams are transmitted from an AP to two or more STAs concurrently. For example, beamforming can be used to transmit a first data stream from the AP to a first STA and a second data stream from the AP to a second STA at substantially the same time. Some APs may include an array of antennas that can be used to transmit and/or receive wireless signals to and from the STAs. More specifically, through beamforming, an AP may utilize multiple antennas to focus energy (e.g., data signals) towards a particular STA in a multi-user environment. The AP relies on channel state information (CSI) to determine the location of the STA and thus the direction in which to focus the signal. However, wireless communications systems typically include mobile devices (e.g., cell phones, tablets, laptop computers, etc.) that often change locations. It is therefore desirable for the AP to adapt its communications parameters based at least in part on the movements of the STAs.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method of selecting a modulation coding scheme (MCS) for transmitting data to a client station (STA). The communications device first predicts the MCS for each of at least two of a plurality of communication modes. The plurality of communication modes may include an open-loop mode and at least one of a single-user multiple-input multiple-output (SU-MIMO) mode or a multiple-user multiple-input multiple-output (MU-MIMO) mode. The communications device then selects one of the plurality of communication modes for transmitting data to the STA based at least in part on the predicted MCSs.

For some embodiments, the communications device may select the SU-MIMO mode if the predicted MCS for the SU-MIMO mode is superior to the predicted MCSs for at least one of the MU-MIMO mode or the open-loop mode. In other embodiments, the communications device may select the open-loop mode if the predicted MCS for the open-loop mode is equal or superior to the predicted MCS for at least one of the SU-MIMO mode or the MU-MIMO mode. The communications device may select the MU-MIMO mode if none of the foregoing conditions are met.

The communications device may predict the MCS for the SU-MIMO mode and/or the MU-MIMO mode, for example, by first generating a stacked channel estimation based at least in part on channel state information received from the STA. The channel state information may be received in response to a null data packets broadcast by the communications device at the start of a sounding interval. The device may then determine squared singular values for each data tone of the stacked channel estimation and calculate a channel capacity based at least in part on the squared singular values. Finally, the communications device may determine a number of achievable bits per subcarrier based at least in part on the channel capacity and select the MCS based at least in part on the number of achievable bits per subcarrier.

The communications device may predict the MCS for the open-loop mode, for example, by first generating a stacked channel estimation based at least in part on channel state information receive from the STA. The device may further calculate an equivalent open loop channel by applying a cyclic delay to the stacked channel estimation. Then, the device may determine squared singular values for each data tone of the equivalent open loop channel and calculate a channel capacity based at least in part on the squared singular values. Finally, the computing device may determine a number of achievable bits per subcarrier based at least in part on the channel capacity and select the MCS based at least in part on the number of achievable bits per subcarrier.

For some embodiments, the communications device may select one of the plurality of communications modes based, at least in part, on a distance between the communications device and the STA. For example, it may be more effective to use beamforming (e.g., SU-MIMO and MU-MIMO) at medium ranges, and it may be more efficient to use open loop communications at greater distances. Thus, the communications device may select the open-loop mode when the distance between the device and the STA exceeds a threshold distance. On the other hand, the communications device may select either the SU-MIMO mode or the MU-MIMO mode when the distance between the device and the STA is less than or equal to the threshold distance.

Still further, for some embodiments, the communications device may select one of the plurality of communications modes based, at least in part, on a Doppler level of the STA. For example, it may be more effective to use beamforming when the STA is relatively still, and it may be more efficient to use open loop communications when the STA is in motion. The communications device may determine the Doppler level of the STA based at least in part on channel state information received from the STA. More specifically, the device may determine a first channel feedback vector based at least in part on channel state information received from the STA at a first instance in time. The device may further determine a second channel feedback vector based at least in part on channel state information received from the STA at a second instance in time. The device may then determine the Doppler level of the STA based at least in part on a difference between the first channel feedback vector and the second channel feedback vector. Accordingly, the communications device may select the open-loop mode when the Doppler level of the STA exceeds a threshold level. On the other hand, the communications device may select the SU-MIMO mode or the MU-MIMO mode when the Doppler level of the STA is less than or equal to the threshold level.

The methods of operation disclosed herein allow a communications device to select an optimal mode of communicating with a STA based, at least in part, on the achievable data rates associated with each of a plurality of communication modes. For example, the mode of communications may be optimized for the communications channel based at least in part on channel state information received from the STA. Alternatively, and/or in addition, the mode of communications may be optimized for the STA based at least in part on the movement and/or location of the STA.

BRIEF DESCRIPTION OF THE DRAWINGS

The present embodiments are illustrated by way of example and are not intended to be limited by the figures of the accompanying drawings, where.

DETAILED DESCRIPTION

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. Embodiments of this disclosure are not to be construed as limited to specific examples described herein but rather to include within their scope all embodiments defined by the appended claims.

Figure 1A:
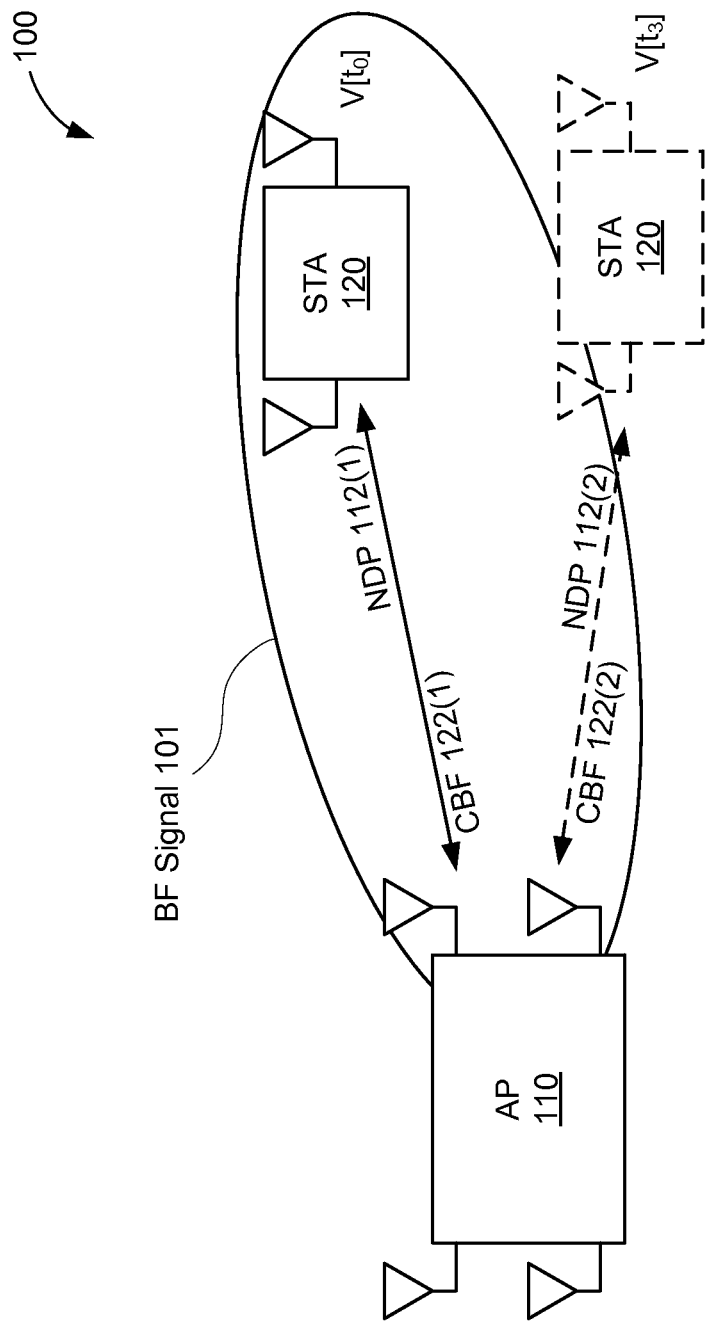
FIG. 1A shows a communications system in accordance with some embodiments.

FIG. 1A shows a communications system 100 in accordance with some embodiments. The communications system 100 includes an access point (AP) 110 and a user station (STA) 120. The AP 110 and STA 120 may be, for example, computers, switches, routers, hubs, gateways, and/or similar devices. For some embodiments, the communications system 100 may correspond to a multi-user multiple-input multiple-output (MU-MIMO) wireless network (e.g., as defined by the IEEE 802.11 ac specification). Thus, the communications system 100 may include multiple STAs and/or APs (not shown for simplicity).

For some embodiments, the AP 110 may optimize communications with the STA 120 by focusing data signals (e.g., as a beam of energy) in the direction of the STA 120. The AP 110 may determine a relative location of the STA 120, and thus the direction in which to direct a beamforming (BF) signal 101, using "sounding" techniques. More specifically, sounding is the process by which the AP 110 acquires channel state information (CSI), for example, by transmitting training data and/or metadata to the STA 120 in the form of a null data packet (NDP) 112. The STA 120 calculates a feedback vector (V) based at least in part on the corresponding training data and returns the feedback vector V to the AP 110 in the form of a compressed beamforming frame (CBF) 122. The AP 110 then uses the feedback vector V to generate a steering matrix (Q) which may be used to pre-code data streams intended for the STA 120. More specifically, the AP 110 may use the steering matrix Q to produce (or "steer") the BF signal 101 in the direction of the STA 120.

In some embodiments, the STA 120 may be a mobile device (e.g., cell phone, tablet, laptop computer, etc.) that moves and/or changes location over time. For example, while both antennas of the STA 120 may be directly within range of the BF signal 101 at time $t_0$, only one antenna is still within the range of the BF signal 101 at time $t_3$. The AP 110 may redirect the BF signal 101 towards the STA 120, for example, by recalculating the steering matrix Q on a periodic basis (e.g., during "sounding intervals"). However, to account for movement by the STA 120 between sounding intervals, the AP 110 may adjust a modulation coding scheme (MCS), for transmitting data to the STA 120, based at least in part on the performance of the current channel.

Figure 1B:
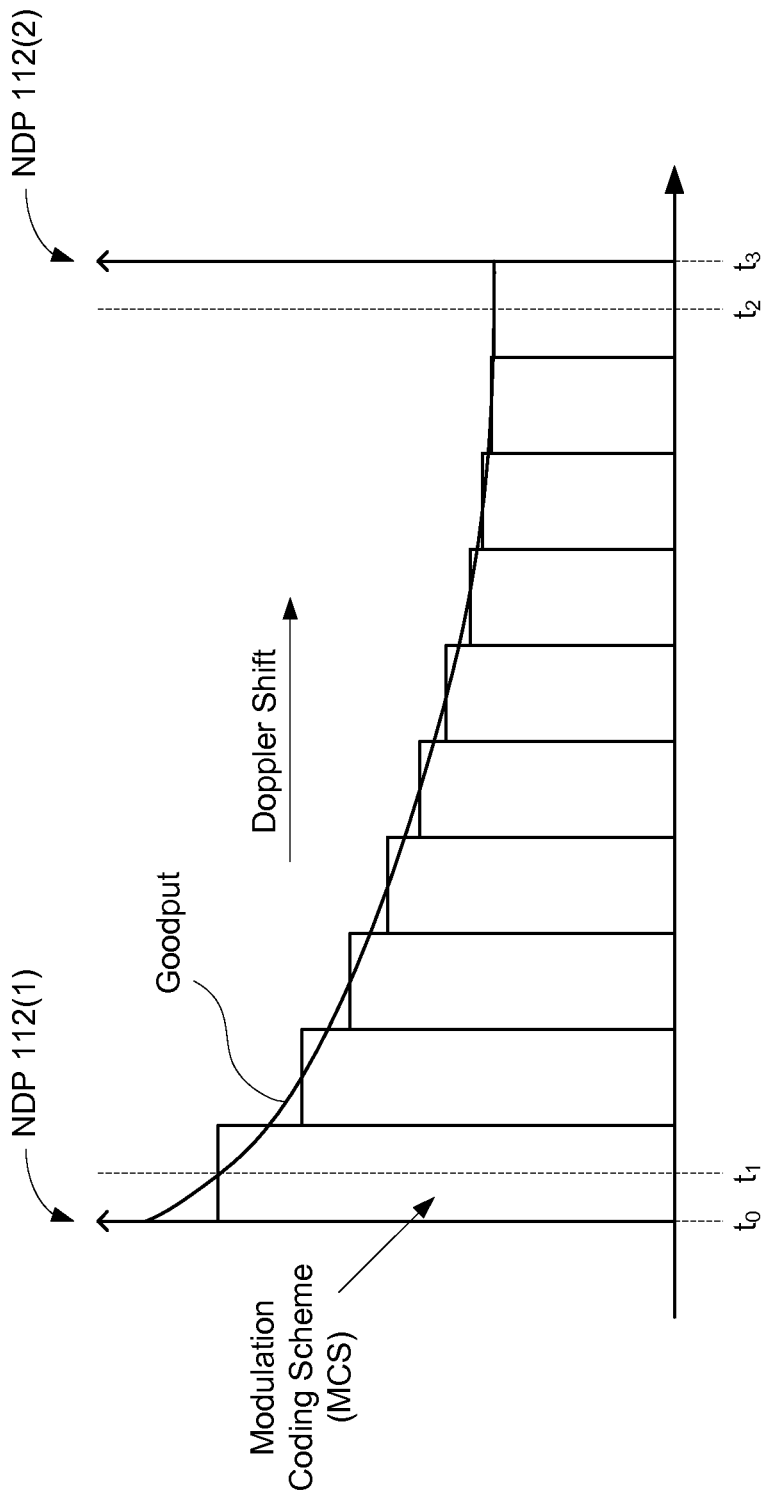
FIG. 1B is an exemplary timing diagram depicting changes in the modulation coding scheme (MCS) implemented by the communications system of FIG. 1A.

For example, with reference to FIG. 1B, the AP 110 may transmit an NDP 112(1) to the STA 120 at the start of a sounding interval (e.g., at time $t_0$). The STA 120 responds with a CBF 122(1) which the AP 110 may use to determine the location of the STA 120 and steer the BF signal 101 in the direction of the STA 120. More specifically, the AP 110 may choose an initial MCS (e.g., data rate) to begin transmitting data to the STA 120 (e.g., at time $t_1$). For some embodiments, the AP 110 may choose the MCS based at least in part on the CSI included with the CBF 122(1). However, as a result of movement by the STA 120 (and/or movement of other devices in the system 100), the overall throughput and/or goodput (e.g., throughput of useful data) of the system 100 deterioriates over time (e.g., from time $t_0$ to $t_3$). To compensate for the drop in goodput, the AP 110 may (e.g., gradually) reduce the MCS or data rate of transmissions to the STA 120. As a result, the MCS used at the end of a sounding interval (e.g., at time $t_2$) may be lower than the MCS used at the beginning of the sounding interval (e.g., at time $t_1$).

When a subsequent sounding interval is initiated (e.g., at time $t_3$), the AP 110 may transmit another NDP 112(2) to the STA 120, and receive another CBF 122(2) in response. At this point, the AP 110 may generate a new BF signal (e.g., or re-steer the BF signal 101) based at least in part on the current location of the STA 120. For some embodiments, the AP 110 may further adjust the MCS based at least in part on the new CSI included with the CBF 122(2) and/or one or more measures of system performance such as, for example, a packet error rate (PER) and/or bit error rate (BER). Under conventional implementations, the AP 110 adjusts the MCS based at least in part on a moving average of the PER measured across the entire sounding interval (e.g., from time $t_0$ to $t_3$).

While the PER measured at time $t_2$ (e.g., PER[$t_2$]) may be a more recent measurement than the PER measured at time $t_1$ (e.g., PER[$t_1$]), PER[$t_1$] may be a more accurate indicator of system performance by which to determine the MCS at the start of a new sounding interval. PER is affected by both the channel estimation (e.g., whether the BF signal 101 accurately tracks the STA 120) and the chosen MCS (e.g., whether the data rate is appropriate for the STA 120 and/or channel conditions). Since PER[$t_1$] reflects the performance of the system 100 immediately after the AP 110 steers the BF signal 101 in the direction of the STA 120 (e.g., based at least in part on CSI feedback from the STA 120), the channel estimation may have little or no bearing on the system performance at that time. In contrast, any subsequent PER measurements (e.g., at times>$t_1$) may be adversely affected by the movement of the STA 120.

For some embodiments, the AP 110 adjusts the MCS at the start of each sounding interval based solely on the PER measured immediately after a previous sounding interval, and on the CSI determined at that time. For example, at time $t_3$, the AP 110 may choose a new MCS to begin the next sounding interval based at least in part on the CSI included with the CBF 122(2) and the PER measured at time $t_1$ (or time $t_0$). Once the new MCS is chosen, the AP 110 may continue to adjust the chosen MCS based at least in part on PER measurements taken over time, until the start of the next sounding interval. Each PER measured during or immediately after sounding is referred to hereafter as an "inter-sounding" PER (e.g., PER$_R$), whereas each PER measured between sounding intervals is referred to as an "intra-sounding" PER (e.g., PER$_A$). Similarly, each MCS that is determined based solely on one or more inter-sounding PERs (e.g., and channel state information) is referred to hereafter as an inter-sounding MCS (e.g., MCS$_R$), whereas each MCS that depends on one or more intra-sounding PERs is referred to as an intra-sounding MCS (e.g., MCS$_A$). For some embodiments, the AP 110 may select an intra-sounding MCS based at least in part on a moving average of two or more intra-sounding PERs within the same sounding interval.

For example, a relatively low PER[$t_1$] (e.g., below a PER threshold) may indicate that a corresponding MCS (e.g., MCS[$t_1$]) is well-suited for the given communications channel. Accordingly, the AP 110 may respond to a low PER$_R$ value by selecting a higher MCS$_R$ for the following sounding interval (e.g., MCS[$t_3$]>MCS[$t_1$]). On the other hand, a relatively high PER[$t_1$] (e.g., above the PER threshold) may indicate that the corresponding MCS (e.g., MCS[$t_1$]) is not well-suited for the given communications channel. Accordingly, the AP 110 may respond to a high PER$_R$ value by selecting a lower MCS$_R$ for the following sounding interval (e.g., MCS[$t_3$]<MCS[$t_1$]).

The loss of goodput due to movement of the STA 120 may be characterized as a "Doppler shift." For some embodiments, the AP 110 may determine an amount and/or degree of Doppler shift for the STA 120 based at least in part on channel feedback acquired during sounding intervals. For example, due to movement of the STA 120, the feedback vector V returned by the STA 120 at the start of the first sounding interval may be different than the feedback vector V returned by the STA 120 at the start of the next sounding interval (e.g., V[$t_i$]≠V[$t_j$]). Accordingly, the AP 110 may calculate a Doppler level (DL) for the STA 120 based at least in part on a difference in the channel feedback from each sounding. For example, the Doppler level for an n×1 feedback vector V may be calculated as:

$$DL = \sqrt[n]{V[t_i]^n - V[t_j]^n} \qquad (1)$$

where V[$t_i$] and V[$t_j$] denote channel feedback vectors measured by the STA 120 at different time instances, $t_i$ and $t_j$.

However, the difference between the two vectors V[$t_i$] and V[$t_j$] may be calculated in a variety of different ways without deviating from the scope of this disclosure (e.g., any type of equation that can correlate a distance between points to a value). For example, where V[$t_i$]=[$v_1(t), v_2(t), \ldots, v_n(t_i)$] and V[$t_j$]=[$v_1(t_j), v_2(t_j), \ldots, v_n(t_j)$], the Doppler level may be calculated as:

$$DL = \sqrt{\sum_{k=1}^{n} [v_k(t_i) - v_k(t_j)]^2}$$

For some embodiments, the AP 110 may use this DL value to further augment the MCS selection process. For example, a higher DL value may indicate a greater degree of movement by the STA 120. Thus, for some embodiments, the AP 110 may adjust the MCS by a degree proportional to the DL value for a given PER threshold. For example, the AP 110 may normally reduce the MCS by a factor of, e.g., 2 based solely on a particular PER measurement. However, by taking into consideration a high DL value, the AP 110 may now reduce the MCS by a factor, e.g., of 3 or 4 based at least in part on the same PER measurement. For other embodiments, the AP 110 may use the DL value to adjust the PER threshold that would trigger a change in the MCS. In reference to the example above, by taking into consideration a high DL value, the AP 110 may reduce the PER threshold that would otherwise cause the MCS to be reduced by a factor of 2. The DL value may be used to augment the selection of both $MCS_R$ and/or $MCS_A$.

Further, for some embodiments, the DL value may be used in determining the length or duration of the sounding interval. For example, a low DL value (e.g., below a lower Doppler threshold) may indicate that the STA 120 is relatively still. Thus, it is likely that a given channel estimation may still be valid even after a substantial amount of time has elapsed. Accordingly, the AP 110 may respond to a low DL value by increasing the length of each sounding interval (e.g., by sounding less often). In contrast, a high DL value (e.g., above an upper Doppler threshold) may indicate a high degree and/or rate of movement by the STA 120, which causes large variations in the channel estimation performed by the AP 110. Thus, in order to track the movements of the STA 120 more precisely, the AP 110 may request more frequent CSI reports from the STA 120, for example, by decreasing the length of each sounding interval (e.g., by sounding more often).

In some embodiments, a DL value may be determined (or augmented) based, at least in part, on uplink acknowledgements (ACKs) from the STA 120. Such embodiments are discussed in greater detail, for example, in U.S. Patent Publication No. US20140254648, titled "Systems and Methods for Determining a Channel Variation Metric," published Sep. 11, 2014, which is hereby incorporated by reference in its entirety.

Figure 2A:
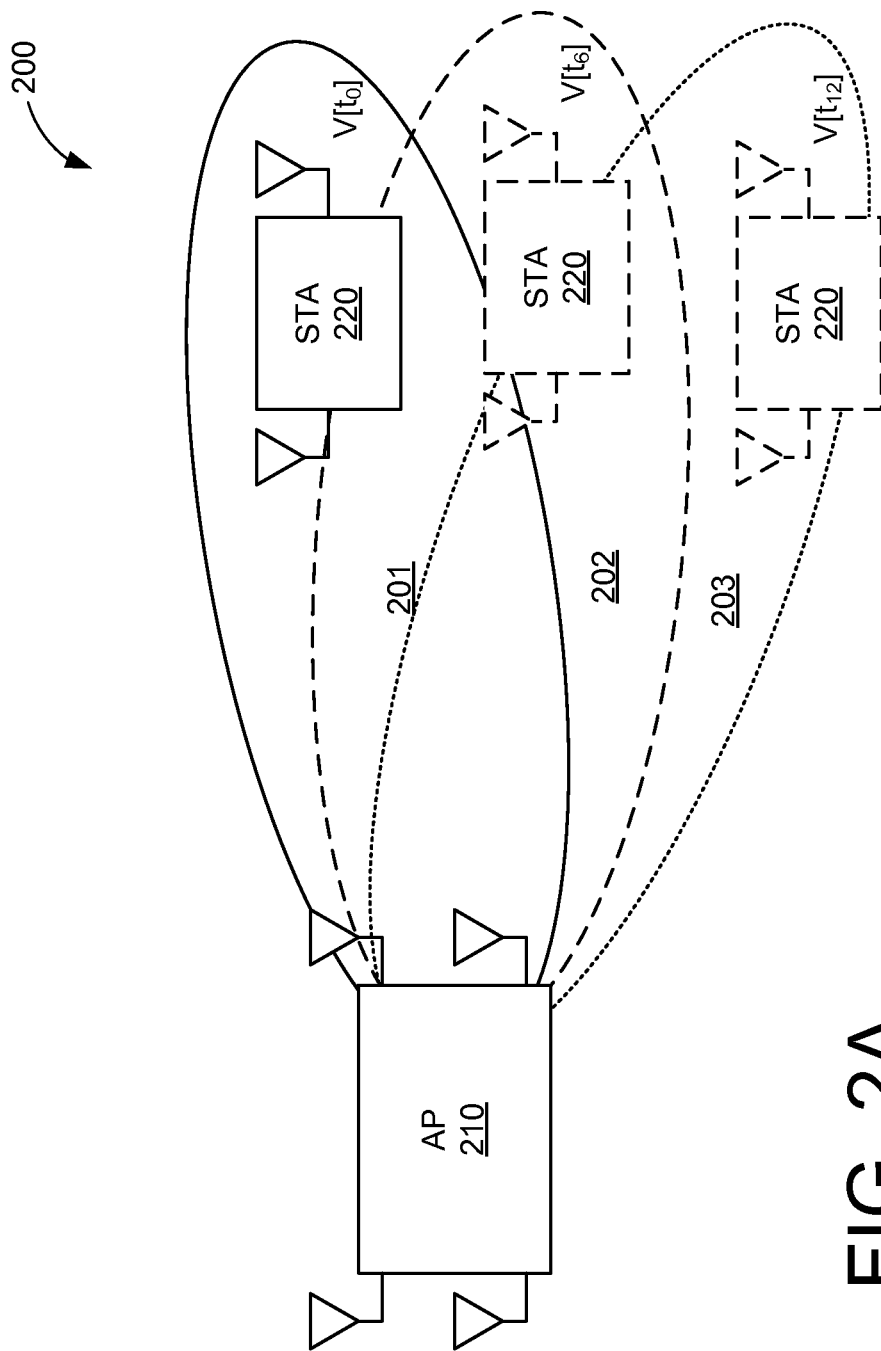
FIG. 2A shows another communications system in accordance with some embodiments.

FIG. 2A shows another communications system 200 in accordance with some embodiments. The communications system 200 includes an AP 210 and a STA 220. As described above, the AP 210 and STA 220 may be, for example, computer, switches, routers, hubs, gateways, and/or similar devices. For some embodiments, the communications system 200 may correspond to a MU-MIMO wireless network (e.g., as defined by the IEEE 802.11 ac specification). Thus, the communications system 200 may include multiple STAs and/or APs (not shown for simplicity).

For some embodiments, the AP 210 may communicate with the STA 220 by focusing data signals in the direction of the STA 220. As described above, the AP 210 may periodically determine the location of the STA 220, and thus the direction in which to direct each BF signal 201-203, using sounding techniques. For example, the AP 210 may steer a first BF signal 201 in the direction of the STA 220 at time $t_0$. Then, based at least in part on subsequent movement by the STA 220, the AP 210 may steer a second BF signal 202 in the direction of the STA 220 at time $t_6$, and may further steer a third BF signal 203 in the direction of the STA at time $t_{12}$. Accordingly, the AP 210 may track the movement of the STA 220 based at least in part on CSI feedback at each sounding interval, and may steer (and/or re-steer) a corresponding BF signal 201-203 in the direction of the STA 220 to improve the channel response.

Figure 2B:
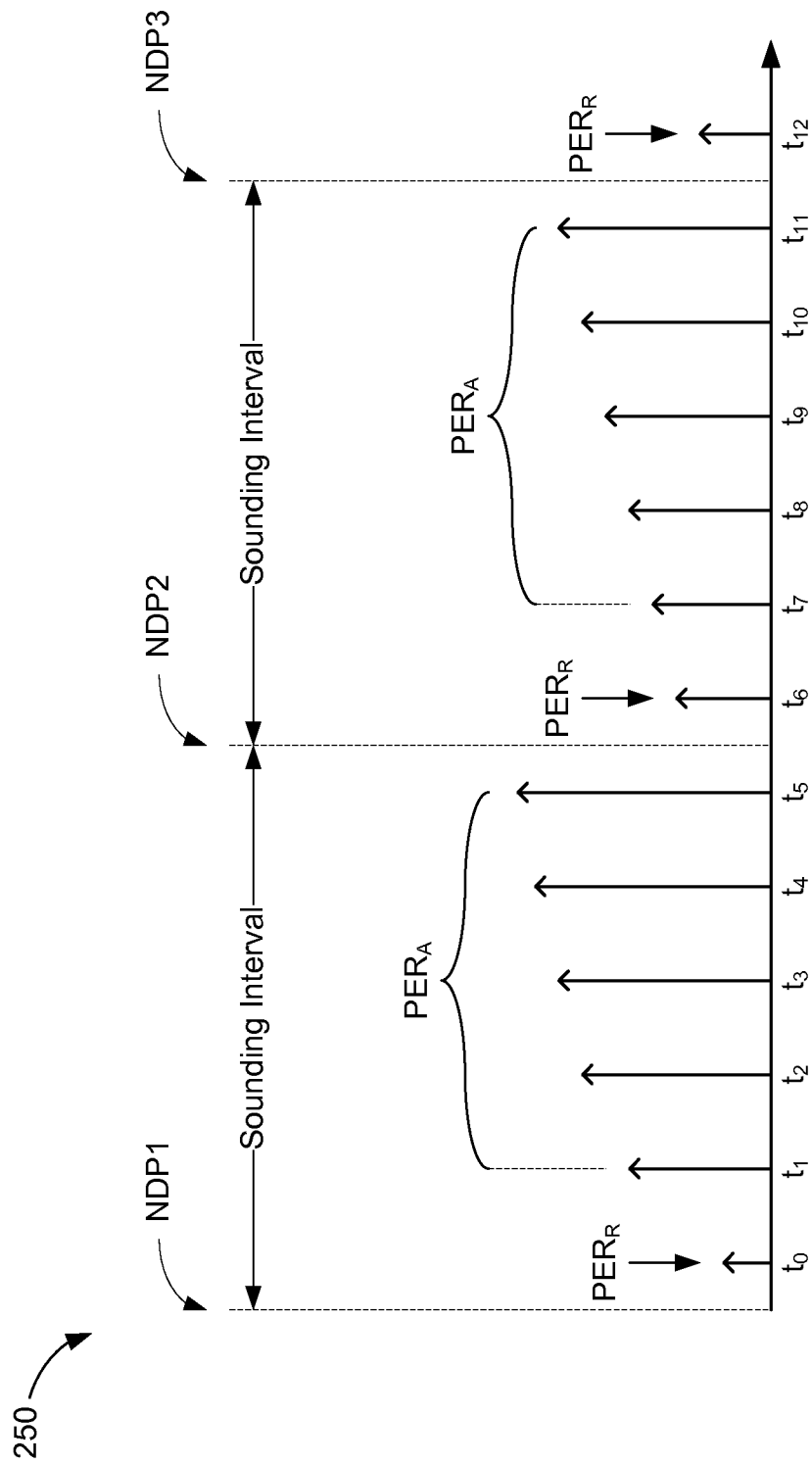
FIG. 2B is an exemplary timing diagram depicting changes in the packet error rate (PER) of the communications system of FIG. 2A.

FIG. 2B is an exemplary timing diagram 250 depicting changes in the packet error rate of the communications system 200 of FIG. 2A. As shown in FIG. 2B, the AP 210 measures a series of PERs over the course of each sounding interval based at least in part on data transmissions to the STA 220. More specifically, a first series of PERs (e.g., $PER[t_0]$-$PER[t_5]$) are measured following a first sounding event (e.g., NDP1) and a second series of PERs (e.g., $PER[t_6]$-$PER[t_{11}]$) are measured following a second sounding event (e.g., NDP2). The first PER in each series (e.g., $PER[t_0]$ and $PER[t_6]$) corresponds to an inter-sounding PER ($PER_R$), whereas the remaining PERs in each series (e.g., $PER[t_1]$-$PER[t_5]$ and $PER[t_7]$-$PER[t_{11}]$) correspond to intra-sounding PERs ($PER_A$s).

The PER immediately following a sounding event (e.g., $PER_R$) may be lower than any subsequent PERs (e.g., $PER_A$) measured for a given sounding interval. For example, at time $t_0$, the STA 220 is directly within the range of BF signal 201. However, as time progresses, the STA 220 may deviate further from the optimal beamforming direction of BF signal 201. Therefore, the $PER_R$ at time $t_0$ is lower (e.g., indicating fewer errors) than the $PER_A$ at times $t_1$ to $t_5$. Similarly, at time $t_6$, the STA 220 is directly within the range of BF signal 202, which causes the $PER_R$ at time $t_6$ to drop relative to the $PER_A$ at time $t_5$. However, the STA 220 gradually moves away from the optimal beamforming direction of the BF signal 202, causing the $PER_A$ to increase from times $t_7$ to $t_{11}$. Finally, at time $t_{12}$, the STA 220 is directly within the range of BF signal 203, which causes another drop in the $PER_R$ at time $t_{12}$ relative to the $PER_A$ at time $t_{11}$.

For some embodiments, the AP 210 may adjust the MCS of the data transmission based at least in part on $PER_R$ and/or $PER_A$. More specifically, immediately following a sounding event, the AP 210 may choose an MCS based at least in part on one or more previous $PER_R$ values. However, in between sounding intervals, the AP 210 may adjust the chosen MCS based at least in part on the $PER_R$ for that sounding interval and/or one or more $PER_A$ values.

Figure 2C:
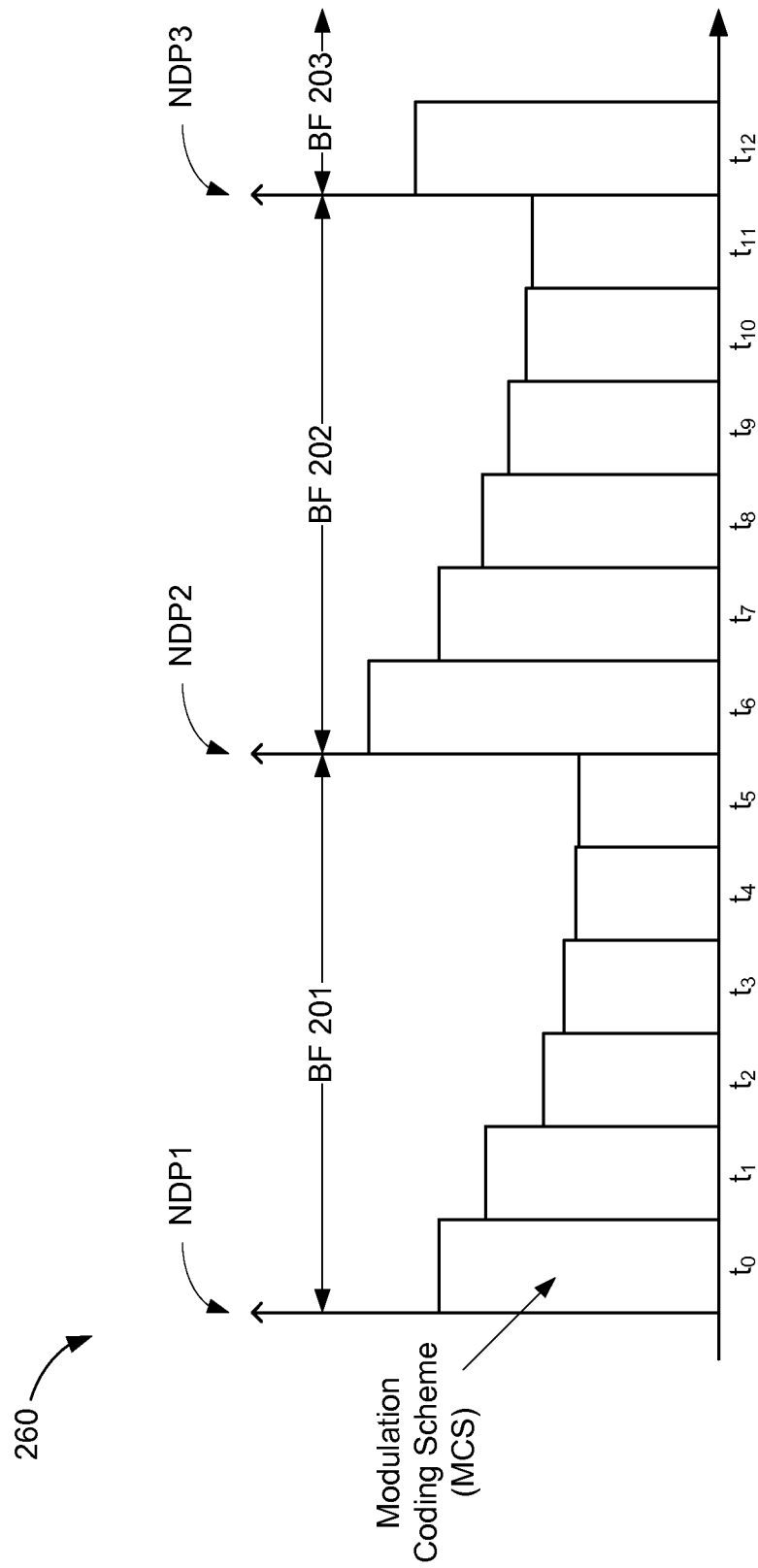
FIG. 2C is an exemplary timing diagram depicting a rate adaptation process that may be implemented by the communications system of FIG. 2A, in accordance with some embodiments.

FIG. 2C is an exemplary timing diagram 260 depicting a rate adaptation process that may be implemented by the communications system 200 of FIG. 2A, in accordance with some embodiments. With reference, for example to FIG. 2C, the AP 210 may select an initial MCS (e.g., based at least in part on CSI feedback from the STA 220) to begin transmitting data to the STA 220 ($t_0$), and then adjust the chosen MCS based at least in part on the PER measured at times $t_0$ to $t_4$. For example, $MCS[t_1]$ may depend on $PER_R[t_0]$, $MCS[t_2]$ may depend on (an average of) $PER_R[t_0]$ and $PER_A[t_1]$, $MCS[t_3]$ may depend on (an average of) $PER_R[t_0]$ and $PER_A[t_1]$-$PER_A[t_2]$, $MCS[t_4]$ may depend on (an average) of $PER_R[t_0]$ and $PER_A[t_1]$-$PER_A[t_3]$, and $MCS[t_5]$ may depend on (an average) of $PER_R[t_0]$ and $PER_A[t_1]$-$PER_A M$.

Because a new sounding event occurs immediately before time $t_6$, the AP 210 may select a new MCS based solely on the $PER_R$ measured at time $t_0$ (e.g., and based at least in part on CSI feedback from the STA 220). The AP 210 may then adjust the new MCS based at least in part on PER values measured at times $t_6$ to $t_{10}$ (e.g., in the manner described above). Then, at time $t_{12}$, the AP 210 may select another MCS based at least in part on the average of $PER_R[t_0]$ and $PER_R[t_6]$ (e.g., and based at least in part on CSI feedback from the STA 220). $MCS[t_6]$ does not depend on any previous intra-sounding PERs (e.g., $PER_A[t_1]$-$PER_A$ND, and that MCS $[t_{12}]$ also does not depend on any previous intra-sounding PERs (e.g., $PER_A[t_7]$-$PER_A[t_{11}]$). The AP 210 may continue in this manner, for example, by selecting a new MCS at the start of each sounding interval based at least in part on a moving average of the previous $PER_R$ values.

Figure 3:
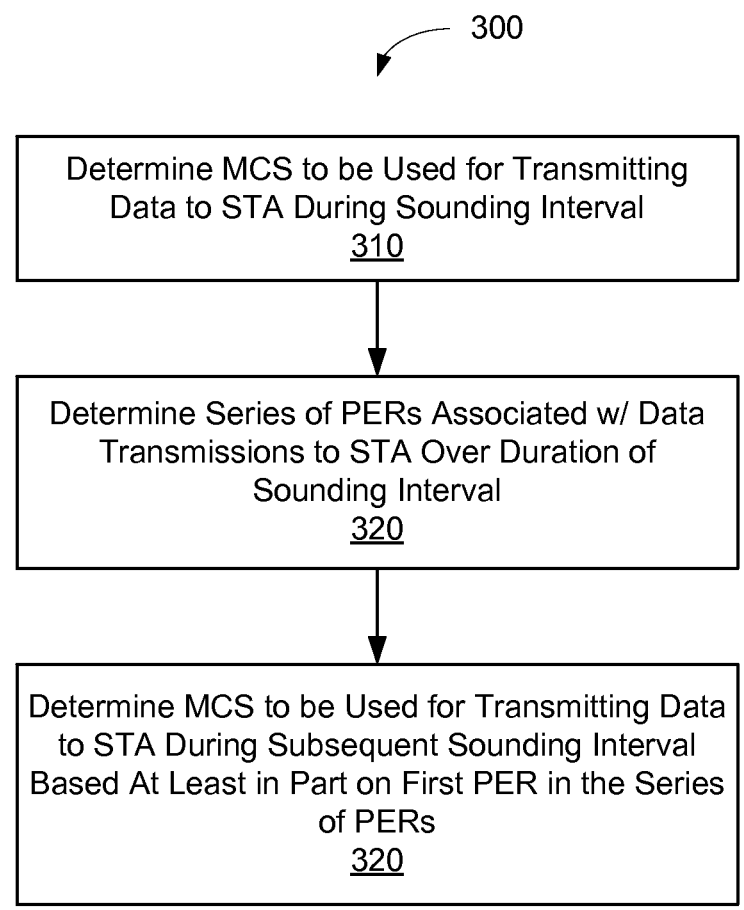
FIG. 3 is an illustrative flow chart depicting a method of determining an MCS to be used for communications with a client station, in accordance with some embodiments.

FIG. 3 is an illustrative flow chart depicting a method 300 of determining an MCS to be used for communications with a client station, in accordance with some embodiments. With reference, for example, to FIG. 2A, the method 300 may be implemented by the AP 210 to configure and/or adjust an MCS to be used for transmitting data to the STA 220. Specifically, the AP 210 may first determine an MCS to be used for transmitting data to the STA 220 during a sounding interval (310). For example, the STA may select a particular MCS based at least in part on CSI received from the STA 220 in response to a sounding event. For some embodiments, the AP 210 may determine an initial MCS to be used for transmitting data to the STA 220 based at least in part on a predicted path loss for the given communications channel (e.g., as described in greater detail below).

The AP 210 then determines a series of PERs that are associated with data transmissions to the STA 220 over the duration of the sounding interval (320). For example, with reference to FIG. 2B, the AP 210 may measure a series of PERs (e.g., $PER[t_0]$-$PER[t_5]$) following a corresponding sounding event (e.g., NDP1). More specifically, the first PER in a corresponding series (e.g., $PER[t_0]$) corresponds to an inter-sounding PER ($PER_R$), whereas the remaining PERs (e.g., $PER[t_1]$-$PER[t_5]$) in the series correspond to intra-sounding PERs ($PER_A$s).

Finally, the AP 210 determines an MCS to be used for transmitting data to the STA during a subsequent sounding interval based at least in part on the first PER in the series of PERs (330). More specifically, the MCS determination may not depend on any of the remaining MCSs in the series. As described above, an inter-sounding PER may be a more accurate indicator of system performance by which to determine an optimal MCS for a given communications channel because it is least likely to be affected by any movement of the STA (e.g., compared to the intra-sounding PERs). For example, the AP 210 may select a higher MCS (e.g., associated with a higher data rate) than the previous inter-sounding MCS if the inter-sounding PER is relatively low (e.g., $PER_R$<PER threshold). Conversely, the AP 210 may select a lower MCS (e.g., associated with a lower data rate) than the previous inter-sounding MCS if the inter-sounding PER is relatively high (e.g., $PER_R$>PER threshold). For some embodiments, the AP 210 may determine the new MCS based at least in part on an average of inter-sounding PERs measured over multiple sounding intervals.

Still further, for some embodiments, the AP 210 may determine the new MCS based, at least in part, on a Doppler level of the STA. More specifically, the DL value may be used to determine the degree by which the AP decreases and/or increases the MCS (e.g., relative to the previous inter-sounding MCS). For example, if the inter-sounding PER is high, the AP 210 may decrease the MCS by a degree proportional to the DL value. Thus, the MCS may be reduced by a greater degree for higher DL values, and by a lesser degree for lower DL values. Conversely, if the inter-sounding PER is low, the AP 210 may increase the MCS by a degree inversely proportional to the DL value. Thus, the MCS may be increased by a lesser degree for higher DL values, and by a greater degree for lower DL values.

Alternatively, the DL value may be used to adjust the PER threshold that would trigger a corresponding change in the MCS. For example, the AP 210 may reduce the PER threshold as it senses more movement by the STA. Thus, the AP 210 may reduce the PER threshold in proportion to the DL value. For example, a higher DL value may cause a greater reduction in the PER threshold. Conversely, a lower DL value may cause a lesser reduction (or increase) in the PER threshold.

Figure 4:
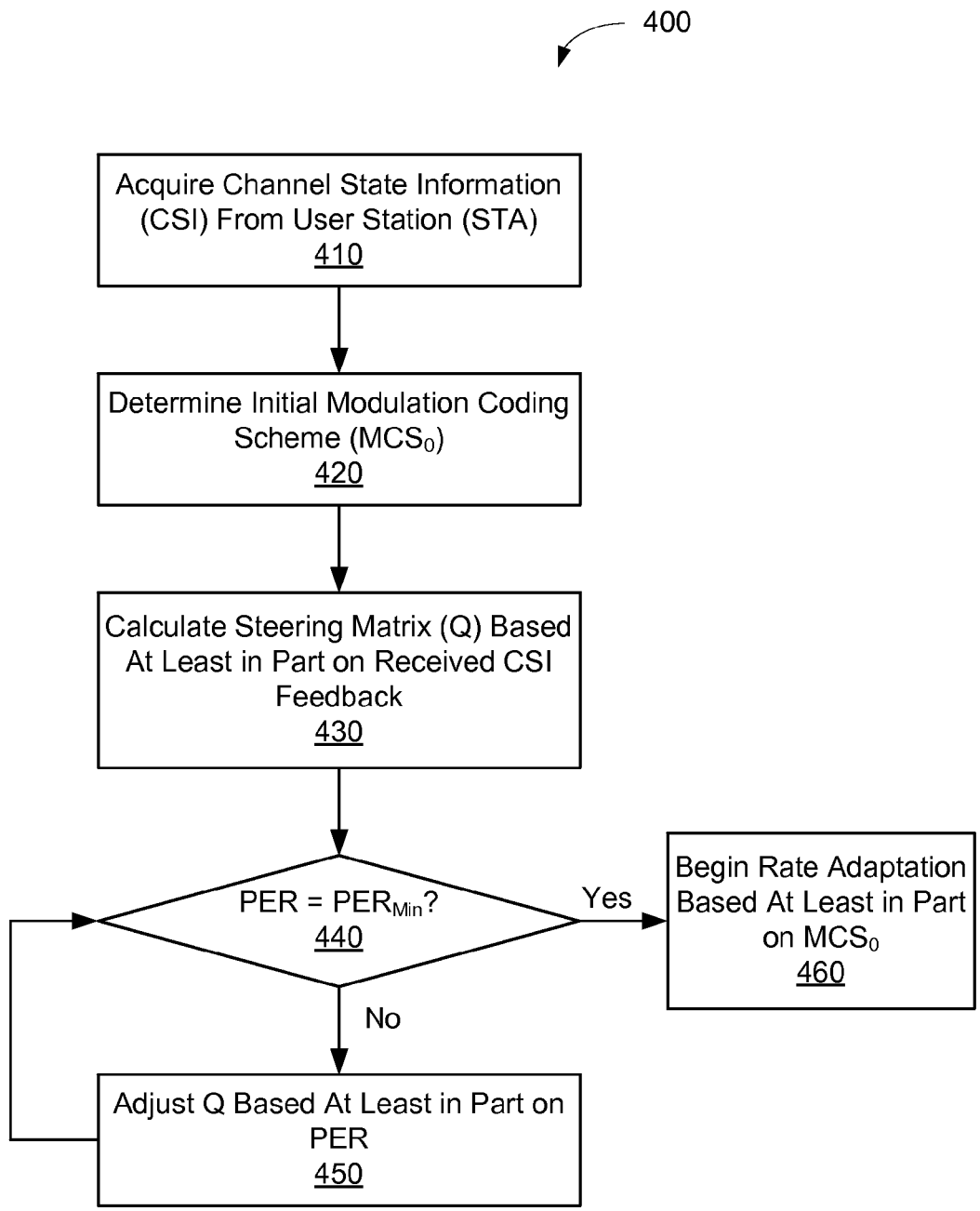
FIG. 4 is an illustrative flow chart depicting a method of determining an initial MCS, in accordance with some embodiments.

FIG. 4 is an illustrative flow chart depicting a method 400 of determining an initial MCS, in accordance with some embodiments. With reference, for example, to FIG. 2A, the method 400 may be implemented by the AP 210 to determine an initial MCS (e.g., $MCS[t_0]$) to be used for transmitting data to the STA 220. Specifically, the AP 210 may first acquire channel state information from a corresponding user station (410). For example, the AP 210 may transmit an NDP containing training data and/or metadata to the STA 220. The STA 220 may respond with a CBF containing the CSI measured by the STA 220 (e.g., which may be in the form of a feedback vector V).

The AP 210 then determines an initial MCS estimate ($MCS_0$) based at least in part on the CSI feedback from the STA 220 (420). For example, the AP 210 may determine the signal-to-interference-plus-noise ratio (SINR) of the wireless communications channel between the AP 210 and the STA 220 based at least in part on the CSI received from the STA 220. The SINR value may be used to predict the path loss of a BF signal directed at the STA 220. The AP 210 may then configure $MCS_0$ based at least in part on the predicted path loss. For example, $MCS_0$ may be set to a data rate that is optimized for the estimated channel, given the predicted path loss.

The AP 210 further calculates a steering matrix (Q) based at least in part on the received CSI feedback from the STA 220 (430). For example, the CSI may include a feedback vector (V) which corresponds to a compressed (e.g., simplified or reduced) representation of the channel measured by the STA 220. The AP 210 uses the feedback vector V to generate the steering matrix Q, which may then be used to generate and/or steer a corresponding BF signal in the direction of the STA 220. Since one of the primary goals of beamforming is to optimize throughput over a given channel, the PER for the channel should be at its lowest when the BF signal is directly aligned with the STA 220.

Thus, the AP 210 may measure the PER for data transmissions based at least in part on $MCS_0$ to determine whether a minimum PER value ($PER_{Min}$) has been achieved (440). For some embodiments, $PER_{Min}$ may correspond to a threshold PER value ($PER_{TH}$). Thus, the AP 210 may determine that a minimum PER value has been achieved as long as the measured PER is below the threshold PER value (e.g., PER<$PER_{TH}$). For other embodiments, $PER_{Min}$ may correspond to a lowest PER measurement for a given set of steering matrices Q. Thus, the AP 210 may acquire a number of PER measurements for a number of different steering matrices Q and determine which particular steering matrix Q yields the lowest PER value.

As long as $PER_{Min}$ has not been reached, the AP 210 may adjust the steering matrix Q based at least in part on the current PER value (450) and acquire a new PER measurement based at least in part on the new steering matrix Q (440). If $PER_{Min}$ has not been achieved, it is likely that the BF signal is not fully aligned with the STA 220. Accordingly, the AP 210 may modify the steering matrix Q to steer the BF signal in a new direction. For some embodiments, the degree and/or direction in which the BF signal is steered may depend on the current PER value and/or the received CSI. For other embodiments, the degree and/or direction of the steering may further depend on a DL value (see Equation 1, above) which characterizes the movement of the STA 220.

Once $PER_{Min}$ has been reached, the AP 210 may proceed with rate adaptation based at least in part on $MCS_0$ (460). More specifically, once the AP 210 is confident in its channel estimation it may then begin to adjust $MCS_0$ based at least in part on inter-sounding and intra-sounding PER measurements (e.g., as described above with respect to FIGS. 1-2). While method 400 is helpful in determining an optimal steering matrix Q to be used for communications between the AP 210 and the STA 220, the method 400 may be time-consuming to implement. Thus, for some embodiments, the method 400 may be implemented by the AP 210 at every $n^{th}$ sounding interval (e.g., where n=100) for purposes of recalibrating the MCS.

Figure 5:
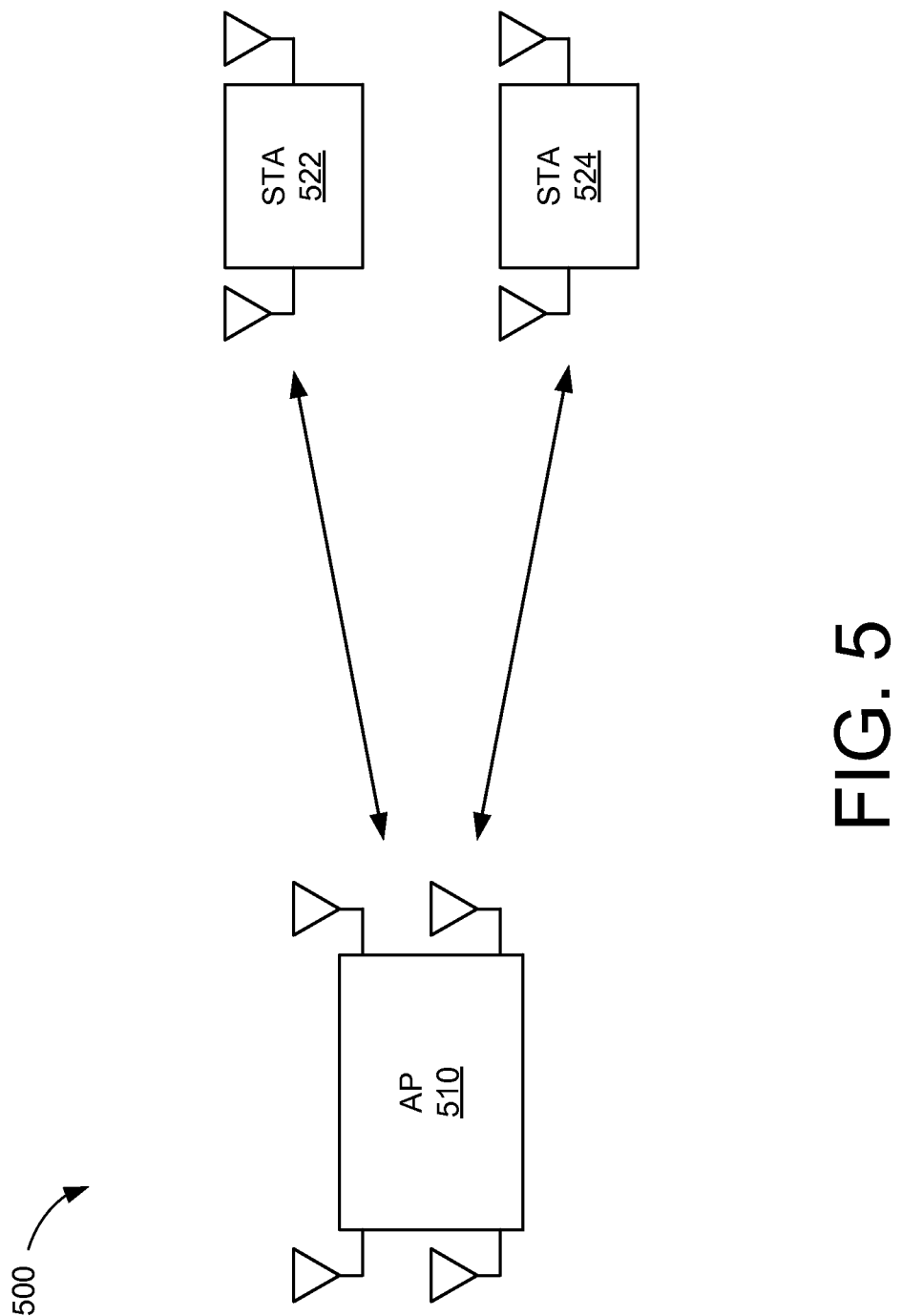
FIG. 5 shows a communications system in accordance with other embodiments.

FIG. 5 shows a communications system 500 in accordance with other embodiments. The communications system 500 includes an AP 510 and multiple STAs 522 and 524. As described above, the AP 510 and STAs 522 and 524 may be, for example, computers, switches, routers, hubs, gateways, and/or similar devices. For some embodiments, the communications system 500 may correspond to an MU-MIMO wireless network (e.g., as defined by the IEEE 802.11ac specification). Depending on the channel properties and/or device capabilities associated with each of the STAs 522 and 524, the AP 510 may communicate with multiple of STAs 522 and 524 concurrently (e.g., via multiple code channels or sub-bands) or sequentially (e.g., via multiple time slots).

For some embodiments, the AP 510 may use orthogonal frequency-division multiplexing (OFDM) to partition the overall system bandwidth into a number (N) of orthogonal sub-bands (e.g., "tones"). Each spatial channel of each tone may be viewed as an independent transmission channel where the complex gain associated with each tone is effectively constant across the bandwidth of that tone. With OFDM, each tone is associated with a respective sub-carrier that may be modulated with data. More specifically, the data to be transmitted on each tone is first modulated (e.g., through symbol mapping) using a particular modulation scheme selected for use with that tone.

As described above, the AP 510 may use beamforming techniques to increase throughput by steering multiple concurrent streams of data to one or more of the STAs 522 and/or 524. More specifically, in a single-user multiple-input multiple-output (SU-MIMO) mode, the AP 510 may focus multiple data signals at one particular STA at a time (e.g., either STA 522 or STA 524). When operating in a multiple-user multiple-input multiple-output (MU-MIMO) mode, the AP 510 may focus multiple data signals on a group of STAs (e.g., both STAs 522 and 524) at substantially the same time. However, the AP 510 may also operate in an open-loop mode by transmitting data without beamforming (e.g., omnidirectionally).

Each mode of communication (e.g., SU-MIMO, MU-MIMO, and open-loop) may be associated with a different modulation coding scheme (MCS) that is optimal for that particular mode of communication over a given channel. For example, beamforming is typically most effective at medium ranges (e.g., 23-30 ft away). As the distance between the AP 510 and STAs 522 and/or 524 increases, the data rate (e.g., MCS) of a beamformed signal may approach that of an omnidirectional signal. At the same time, it may be much more efficient to transmit data omnidirectionally than to use beamforming.

Thus, for some embodiments, the AP 510 may predict an MCS or data rate for each mode of communication (e.g., SU-MIMO, MU-MIMO, or open loop), and select a mode of communication (e.g., SU-MIMO, MU-MIMO, or open-loop) based, at least in part, on the predicted MCS. For example, if the MCS for SU-MIMO communications between the AP 510 and the STA 522 is superior (e.g., higher data rate) to the combined MCS for MU-MIMO communications between the AP 510 and the STAs 522 and 524, the AP 510 may select SU-MIMO as the preferred mode of communication with the STA 522. On the other hand, if the MCS for open-loop communications between the AP 510 and the STA 522 is equal or superior to the overall MCS associated with any beamforming techniques, the AP 510 may select open-loop as the preferred mode of communication with the STA 522.

Figure 6:
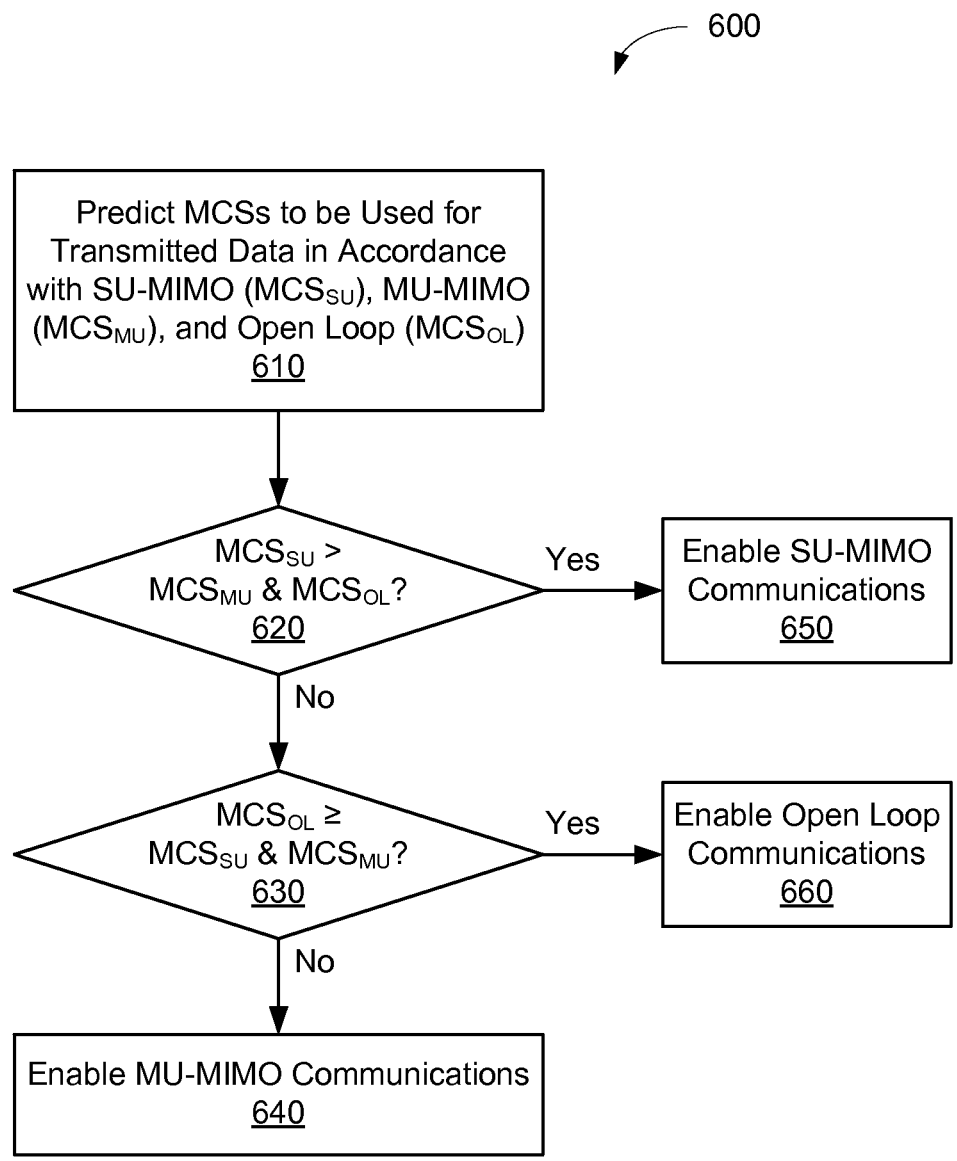
FIG. 6 is an illustrative flow chart depicting a method of configuring a communications device for one of a plurality of communication modes, in accordance with some embodiments.

FIG. 6 is an illustrative flow chart depicting a method 600 of configuring a communications device for one of a plurality of communication modes, in accordance with some embodiments. With reference, for example, to FIG. 5, the method 600 may be performed by the AP 510 to select a particular mode of communication with one of the STAs (e.g., STA 522). Specifically, the AP 510 may first predict an MCS to be used for transmitting data to the STA 522 in accordance with each of the communication modes (610). For example, the AP 510 may predict an MCS that would be used for SU-MIMO communications with the STA 522, individually (e.g., as described below with respect to FIG. 7). The AP 510 may also predict an MCS that would be used for MU-MIMO communications with the STA 522, as part of a group that includes STA 524 (e.g., as described below with respect to FIG. 7). The AP 510 may further predict an MCS that would be used for open loop communications with the STA 522 (e.g., as described below with respect to FIG. 8).

The AP 510 may then compare each of the predicted MCSs in order to select a particular mode of communicating with the STA 522. More specifically, the AP 510 may select the communications mode associated with the highest MCS index (e.g., corresponding to the highest data rate) while also providing the most efficient means of data transmission. For example, if the predicted MCS for SU-MIMO communications is superior to (e.g., provides higher data rate than) the predicted MCS for both MU-MIMO and open loop communications (620), the AP 510 may enable SU-MIMO communications with the STA 522 (650). On the other hand, if the predicted MCS for open loop communications is equal or superior to the predicted MCS for SU-MIMO communications and is equal or superior to the predicted MCS for MU-MIMO communications (630), the AP 510 may enable open loop communications with the STA 522 (660). If none of the above conditions are met, the AP 510 may enable MU-MIMO communications with the STA 522 (640).

The decision to use beamforming (e.g., SU-MIMO or MU-MIMO) or open loop communications may further depend on the location and/or movement (e.g., Doppler level) of the STA 522. As described above, beamforming is typically most effective at medium ranges. Thus, as the STA 522 moves further from the AP 510, the optimal MCS of a beamformed data signal may approach that of an open loop data signal (e.g., which is more efficient). Therefore, it may be preferable for the AP 510 to enable open loop communications when the STA 522 is further away (e.g., exceeding a threshold distance) from the AP 510, and enable beamforming when the STA 522 is closer (e.g., within the threshold distance) to the AP 510.

Further, as described above, beamforming is typically most effective when the STA 522 is directly in the path of the beamformed signal. However, as the STA 522 moves, the AP 510 may need to update the beamforming direction to track the movements of the STA 522. In contrast, the movements of the STA 522 tend to have little, if any, impact on the effectiveness of open loop communications. Therefore, it may be preferable for the AP 510 to enable open loop communications when the Doppler level of the STA 522 is relatively high (e.g., exceeding a threshold level), and enable beamforming when the Doppler level of the STA 522 is relatively low (e.g., within the threshold level).

Figure 7:
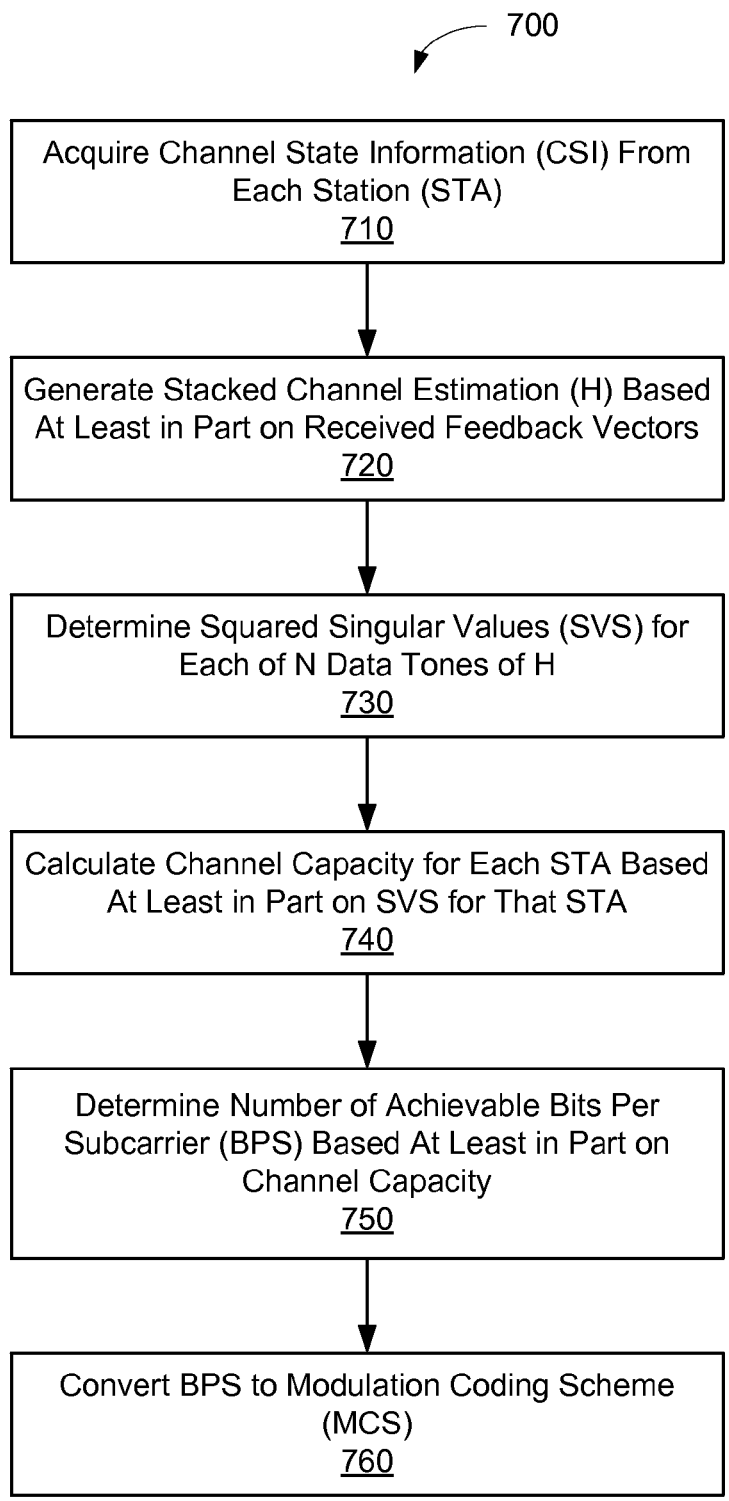
FIG. 7 is an illustrative flow chart depicting a method of determining an MCS for beamformed data transmissions, in accordance with some embodiments.

FIG. 7 is an illustrative flow chart depicting a method 700 of determining an MCS for beamformed data transmissions, in accordance with some embodiments. With reference, for example, to FIG. 45 the method 700 may be implemented by the AP 510 to predict an MCS for data transmissions to the STAs 522 and/or 524 using SU-MIMO and/or MU-MIMO modes of communication. Specifically, the AP 510 may first acquire channel state information from each of the STAs 522 and 524 (710). As described above, the AP 510 may transmit an NDP containing training data and/or metadata to each of the STAs 522 and 524 during a sounding event. The STAs 522 and 524 may each respond to the NDP by sending back a CBF which contains the CSI measured by that STA in compressed form (e.g., presented as a feedback vector V).

The AP 510 then generates a stacked channel estimation (H) based at least in part on the received feedback vectors (720). To generate H for an MU-MIMO communication (e.g., $H_{MU}$), the AP 510 may combine the received feedback vectors V from each of the STAs 522 and 524 to form the stacked channel matrix $H_{MU}$. For example, assuming the AP 510 has 4 transmit antennas and each of the STAs 522 and 524 receives only 1 data stream, $H_{MU}$ may be a 4×2 matrix for 234 data tones. On the other hand, to generate H for an SU-MIMO communication (e.g., $H_{SU}$), the feedback vector V from a particular STA 522 or 524 may be directly converted to the stacked channel matrix $H_{SU}$, since beamforming is applied in only one direction.

The AP 510 further determines the squared singular values (SVS) for each of N data tones of the channel H (730). For example, the SVS values may be acquired through matrix factorization or decomposition of the channel estimation matrix $H_{MU}$. Because $H_{su}$ is essentially a vector, no matrix decomposition may be necessary.

The AP 510 may then calculate the channel capacity for each of the STAs 522 and 524 based at least in part on the SVS for that STA (740). For example, the channel capacity for all N tones may be calculated using the following equation (e.g., for k=1:N):

$$C_k = C_{k-1} + \Sigma \min(\log_2(1 + SNR \cdot SVS(k,:)), u) \qquad (2)$$

where $C_0$=0, u corresponds to a predetermined threshold based at least in part on the modulation scheme (e.g., u=8 for 256-QAM), SNR represents the average signal-to-noise ratio for a particular STA, and SVS(k,:) represents the squared singular values for that STA, and $C_N$ is the overall channel capacity for all N tones.

Finally, the AP 510 may determine a number of achievable bits PER sub-carrier (BPS) based at least in part on the channel capacity (750), and convert the BPS value to a particular MCS (760). For example, the AP 510 may calculate BPS by taking the overall channel capacity $C_N$ and dividing by the total number of sub-carriers or tones N (e.g., BPS=$C_N$/N). The AP 510 may then convert the BPS value to an MCS, for example, using a lookup table (e.g., a table of MCS vs. BPS).

Figure 8:
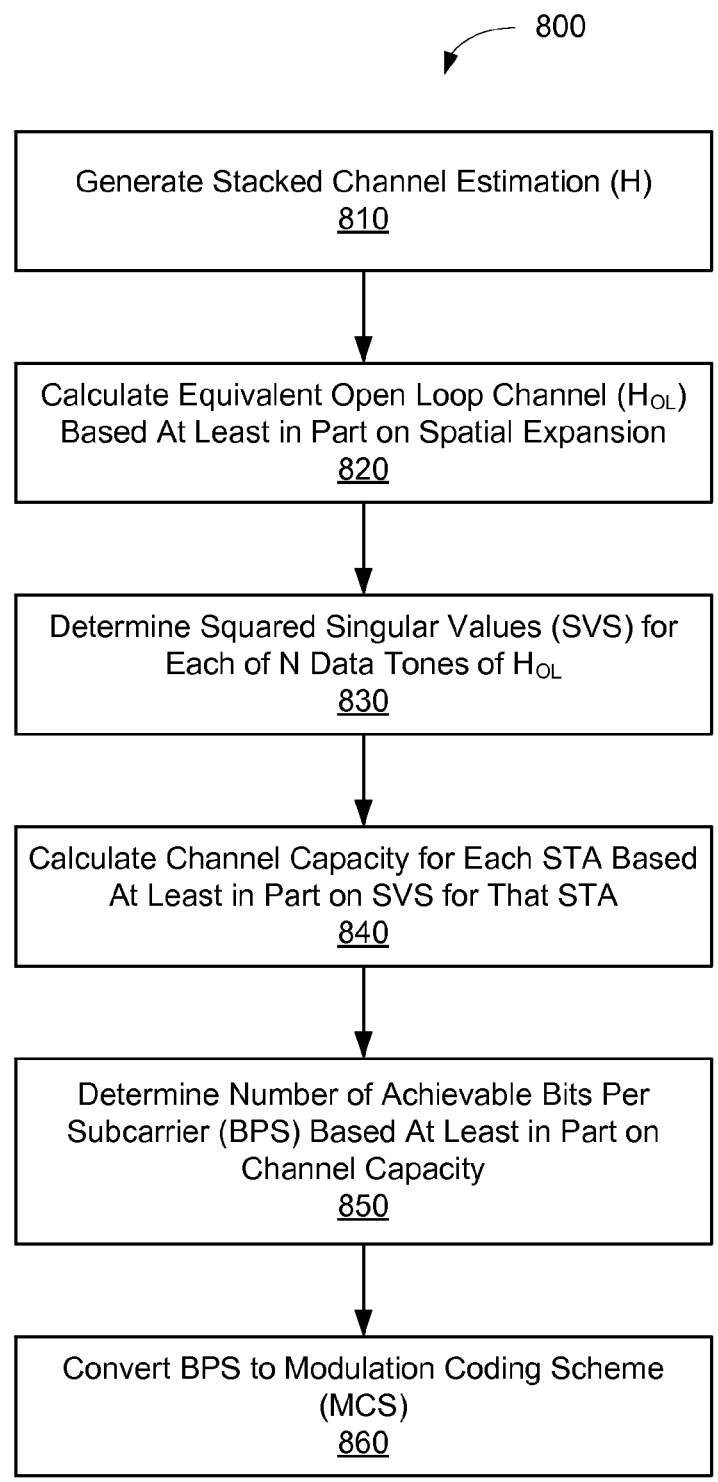
FIG. 8 is an illustrative flow chart depicting a method of determining an MCS for open-loop data transmissions, in accordance with some embodiments.

FIG. 8 is an illustrative flow chart depicting a method 800 of determining an MCS for open-loop data transmissions, in accordance with some embodiments. With reference, for example, to FIG. 5, the method 800 may be implemented by the AP 510 to predict an MCS for data transmissions to the STAs 522 and/or 524 using an open-loop mode of communication. Specifically, the AP 510 may first generate a stacked channel estimation (H), for example, based at least in part on CSI feedback from each of the STAs 522 and 524 (810). As described above, with respect to FIG. 7, the AP 510 may transmit an NDP to each of the STAs 522 and 524 and receive a corresponding feedback vector V from each respective STA. The AP 510 may then generate the stacked channel estimation matrix H by combining the received feedback vectors V from each of the STAs 522 and 524 (e.g., for $H_{MU}$) or by directly converting the feedback vector V from one of the STAs 522 or 524 (e.g., for $H_{SU}$).

The AP 510 may then calculate an equivalent open loop channel ($H_{OL}$) based at least in part on spatial expansion (820). Spatial expansion is a technique for improving the signal quality of data communications between the AP 510 and a STA, for example, by mapping a number of data streams to an even greater number of transmit antennas. For example, spatial expansion may improve signal reception at the STA by mitigating the spectral humps and notches in the received signal caused by multi-path fading. Spatial expansion may be implemented using a cyclic delay matrix which causes cyclic shifts across the antenna array. Thus, the AP 510 may calculate the equivalent open loop channel matrix ($H_{OL}$) by applying the cyclic delay matrix to the channel estimation matrix H.

The AP 510 further determines the squared singular values (SVS) for each of N data tones of the open-loop channel $H_{OL}$ (830) and calculates the channel capacity for each of the STAs 522 and 524 based at least in part on the SVS for that STA (840). As described above, the SVS values may be acquired through matrix factorization or decomposition of the open-loop channel matrix $H_{OL}$. The channel capacity for all N tones ($C_N$) may then be calculated using Equation 2 (e.g., as described above with respect to FIG. 7).

Finally, the AP 510 may determine a number of achievable bits PER sub-carrier (BPS) based at least in part on the channel capacity (850), and convert the BPS value to a particular MCS (860). For example, the AP 510 may calculate BPS by taking the overall channel capacity $C_N$ and dividing by the total number of sub-carriers or tones N (e.g., BPS=$C_N$/N). The AP 510 may then convert the BPS value to an MCS, for example, using a lookup table (e.g., a table of MCS vs. BPS).

Figure 9:
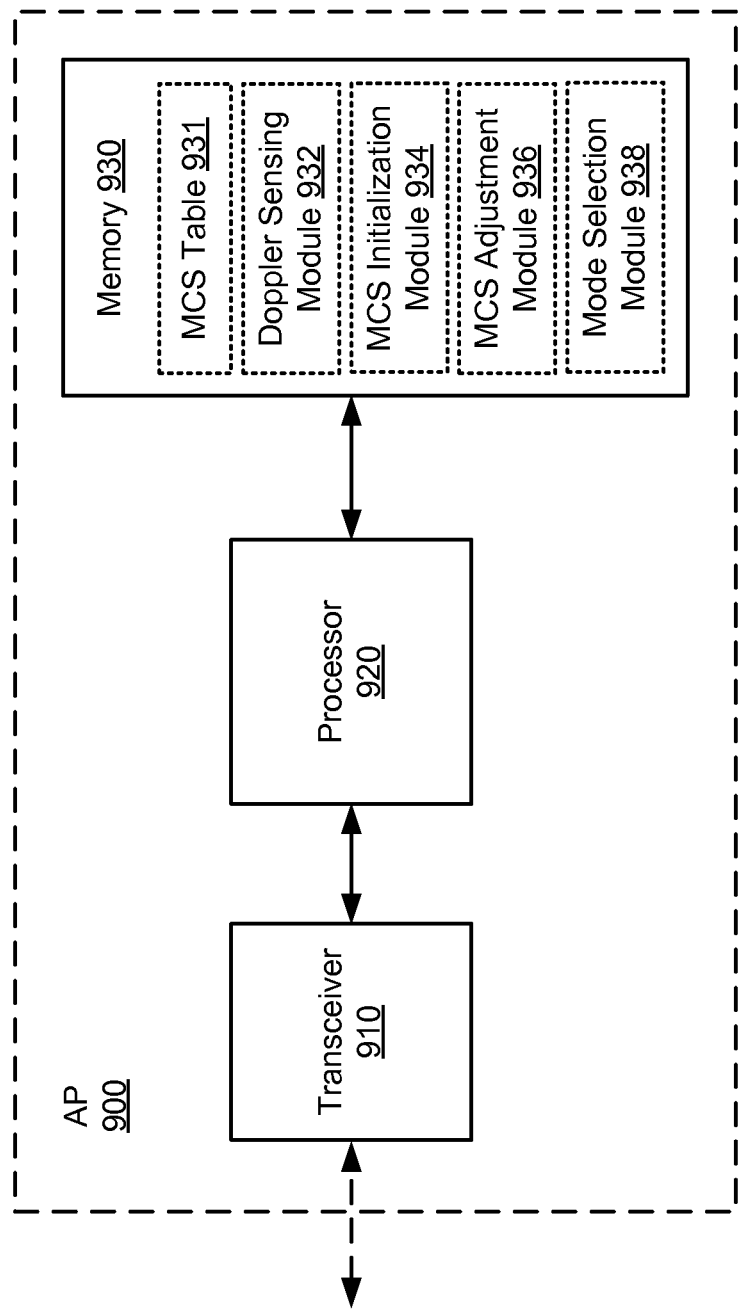
FIG. 9 shows a block diagram of an access point (AP) in accordance with some embodiments.

FIG. 9 shows a block diagram of an access point (AP) 900 in accordance with some embodiments. The AP 900 includes a transceiver 910, a processor 920, and a memory 930. The transceiver 910 may be used to communicate wirelessly with one or more STAs, with one or more other APs, and/or with other suitable wireless devices. Processor 720, which is coupled to transceiver 910 and memory 930, may be any suitable processor capable of executing scripts or instructions of one or more software programs stored in the AP 900 (e.g., within memory 930).

Memory 930 may include an MCS table 931 that stores MCS index values that may be used to reference various combinations of communication parameters (e.g., number of spatial streams, modulation type, and coding rate) which determine the data rate of the communications system. In general, higher MCS index values correspond with higher data rates for a given number of spatial streams and modulation type. Memory 930 may also include a non-transitory computer-readable medium (e.g., one or more nonvolatile memory elements, such as EPROM, EEPROM, Flash memory, a hard drive, etc.) that may store the following software modules:

a Doppler sensing module 932 to determine the Doppler level (e.g., degree of movement) of a STA based at least in part on a difference between two or more received channel feedback vectors;
  an MCS initialization module 934 to determine an initial MCS to be used for transmitting data to the STA based at least in part on a predicted path loss of the communications channel;
  an MCS adjustment module 936 to adjust the MCS used for transmitting data to the STA (e.g., by selecting a new MCS) based at least in part on one or more inter-sounding and/or intra-sounding PERs; and
  a mode selection module 938 to configure the AP 900 for one of a plurality of communication modes based at least in part on a predicted MCS to be used for transmitting data in accordance with each of the plurality of modes.

Each software module includes instructions that, when executed by processor 920, causes the AP 900 to perform the corresponding functions. The non-transitory computer-readable medium of memory 930 thus includes instructions for performing all or a portion of the operations described above with respect to FIGS. 3, 4, and 6-8.

Processor 920, which is shown in the example of FIG. 9 as coupled to transceiver 910 and memory 930, may be any suitable processor capable of executing scripts or instructions of one or more software programs stored in the AP 900 (e.g., within memory 930). For example, processor 920 may execute the Doppler sensing module 932 to determine the Doppler level of a STA based at least in part on a difference between two or more received channel feedback vectors. Processor 920 may also execute the MCS initialization module 934 to determine an initial MCS to be used for transmitting data to the STA based at least in part on a predicted path loss of the communications channel. Further, the processor 920 may execute the MCS adjustment module 936 to adjust the MCS used for transmitting data to the STA (e.g., by selecting a new MCS) based at least in part on one or more inter-sounding and/or intra-sounding PERs. Still further, the processor 920 may execute the mode selection module 938 to configure the AP 900 for one of a plurality of communication modes based at least in part on a predicted MCS to be used for transmitting data in accordance with each of the plurality of modes.

In the foregoing specification, embodiments have been described with reference to specific examples. It will, however, be evident that various modifications and changes may be made thereto without departing from the broader scope of the disclosure as set forth in the appended claims. For example, the method steps depicted in the flow charts of FIGS. 3, 4, and 6-8 may be performed in other suitable orders, multiple steps may be combined into a single step, and/or some steps may be omitted (or further steps included). The specification and drawings are, accordingly, to be regarded in an illustrative sense rather than a restrictive sense.

What is claimed is:

1. A method of operating a communications device in one or more of a plurality of communication modes, the method comprising:
    determining a first modulation coding scheme (MCS) to be implemented for transmitting data to a station (STA) when operating in a multiple-user multiple-input multiple-output (MU-MIMO) mode;
    determining a second MCS to be implemented for transmitting data to the STA when operating in a single-user multiple-input multiple-output (SU-MIMO) mode;
    determining a third MCS to be implemented for transmitting data to the STA when operating in an open loop mode;
    comparing respective data rates for each of the first, second, and third MCSs with the data rates for others of the first, second, and third MCSs;
    determining, based on the comparison, which of the MU-MIMO, SU-MIMO, or open loop communication modes is associated with the highest data rate among the respective data rates; and
    selecting one of the MU-MIMO, SU-MIMO, or open loop communication modes for transmitting data to the STA based at least in part on which of the MU-MIMO, SU-MIMO, or open loop communication modes is associated with the highest data rate.

2. The method of claim 1, wherein the selecting comprises:
    selecting the SU-MIMO mode if the data rate for the second MCS is higher than the data rate for the first MCS.

3. The method of claim 1, wherein the selecting comprises:
    selecting the open-loop mode if the data rate for the third MCS is equal to or higher than the data rate for at least one of the second MCS or the first MCS.

4. The method of claim 1, wherein determining at least one of the first MCS or the second MCS comprises:
    generating a stacked channel estimation based at least in part on channel state information received from the STA;
    determining squared singular values for each data tone of the stacked channel estimation;
    calculating a channel capacity based at least in part on the squared singular values;
    determining a number of achievable bits per subcarrier based at least in part on the channel capacity; and
    determining the first MCS or the second MCS based at least in part on the number of achievable bits per subcarrier.

5. The method of claim 1, wherein determining the third MCS comprises:
    generating a stacked channel estimation based at least in part on channel state information received from the STA;
    calculating an equivalent open loop channel by applying a cyclic delay to the stacked channel estimation;
    determining squared singular values for each data tone of the equivalent open loop channel;
    calculating a channel capacity based at least in part on the squared singular values;
    determining a number of achievable bits per subcarrier based at least in part on the channel capacity; and
    determining the third MCS based at least in part on the number of achievable bits per subcarrier.

6. The method of claim 1, wherein the selecting comprises:
    selecting one of the MU-MIMO, SU-MIMO, or open loop modes based at least in part on a distance between the communications device and the STA.

7. The method of claim 6, wherein the selecting further comprises:
    selecting the open-loop mode if the distance between the communications device and the STA exceeds a threshold distance; and
    selecting one of the SU-MIMO mode or the MU-MIMO mode if the distance between the communications device and the STA is less than or equal to the threshold distance.

8. The method of claim 1, further comprising:
    determining a Doppler level of the STA based at least in part on channel state information received from the STA.

9. The method of claim 8, wherein the selecting comprises:
    selecting one of the MU-MIMO, SU-MIMO, or open loop modes based at least in part on the Doppler level of the STA.

10. The method of claim 9, wherein the selecting further comprises:

selecting the open-loop mode if the Doppler level of the STA exceeds a threshold level; and selecting one of the SU-MIMO mode or the MU-MIMO mode if the Doppler level of the STA is less than or equal to the threshold level.

11. A communications device, comprising:

a memory element storing instructions for selecting a modulation coding scheme (MCS) for transmitting data to a station (STA); and one or more processors that, upon executing the instructions, cause the communications device to:
- determine a first MCS to be implemented for transmitting data to the STA when operating in a multiple-user multiple-input multiple-output (MU-MIMO) mode;
- determine a second MCS to be implemented for transmitting data to the STA when operating in a single-user multiple-input multiple-output (SU-MIMO) mode;
- determine a third MCS to be implemented for transmitting data to the STA when operating in an open loop mode;
- compare respective data rates for each of the first, second, and third MCSs with the data rates for others of the first, second, and third MCSs;
- determine, based on the comparison, which of the MU-MIMO, SU-MIMO, or open loop communication modes is associated with the highest data rate among the respective data rates; and
- select one of the MU-MIMO, SU-MIMO, or open loop communication modes for transmitting data to the STA based at least in part on which of the MU-MIMO, SU-MIMO, or open loop communication modes is associated with the highest data rate.

12. The communications device of claim 11, wherein execution of the instructions to select one of the plurality of communication modes causes the device to:
select the SU-MIMO mode if the data rate for the second MCS is higher than the data rate for the first MCS.

13. The communications device of claim 11, wherein execution of the instructions to select one of the plurality of communication modes causes the device to:
select the open-loop mode if the data rate for the third MCS is equal to or higher than the data rate for at least one of the second MCS or the first MCS.

14. The communications device of claim 11, wherein execution of the instructions to determine at least one of the first MCS or the second MCS causes the device to:
generate a stacked channel estimation based at least in part on channel state information received from the STA;
determine squared singular values for each data tone of the stacked channel estimation;
calculate a channel capacity based at least in part on the squared singular values;
determine a number of achievable bits per subcarrier based at least in part on the channel capacity; and
determine the first MCS or the second MCS based at least in part on the number of achievable bits per subcarrier.

15. The communications device of claim 11, wherein execution of the instructions to determine the third MCS causes the device to:
generate a stacked channel estimation based at least in part on channel estate information received from the STA;
calculate an equivalent open loop channel by applying a cyclic delay to the stacked channel estimation;
determine squared singular values for each data tone of the equivalent open loop channel;
calculate a channel capacity based at least in part on the squared singular values;
determine a number of achievable bits per subcarrier based at least in part on the channel capacity; and
determine the third MCS based at least in part on the number of achievable bits per subcarrier.

16. The communications device of claim 11, wherein execution of the instructions to select one of the MU-MIMO, SU-MIMO, or open loop communication modes causes the device to:
select one of the MU-MIMO, SU-MIMO, or open loop modes based, at least in part, on a distance between the communications device and the STA.

17. The communications device of claim 16, wherein execution of the instructions to select one of the MU-MIMO, SU-MIMO, or open loop communication modes further causes the device to:
select the open-loop mode if the distance between the communications device and the STA exceeds a threshold distance; and
select one of the SU-MIMO mode or the MU-MIMO mode if the distance between the communications device and the STA is less than or equal to the threshold distance.

18. The communications device of claim 11, wherein execution of the instructions further causes the device to:
determine a Doppler level of the STA based at least in part on channel state information received from the STA.

19. The communications device of claim 18, wherein execution of the instructions to select one of the MU-MIMO, SU-MIMO, or open loop communication modes causes the device to:
select one of the MU-MIMO, SU-MIMO, or open loop modes based, at least in part, on the Doppler level of the STA.

20. The communications device of claim 19, wherein execution of the instructions to select one of the MU-MIMO, SU-MIMO, or open loop communication modes further causes the device to:
select the open-loop mode if the Doppler level of the STA exceeds a threshold level; and
select one of the SU-MIMO mode or the MU-MIMO mode if the Doppler level of the STA is less than or equal to the threshold level.

21. A communications device, comprising:
means for determining a first modulation coding scheme (MCS) to be implemented for transmitting data to a station (STA) when operating in a multiple-user multiple-input multiple-output (MU-MIMO) mode;
means for determining a second MCS to be implemented for transmitting data to the STA when operating in a single-user multiple-input multiple-output (SU-MIMO) mode;
means for determining a third MCS to be implemented for transmitting data to the STA when operating in an open loop mode;
means for comparing respective data rates for each of the first, second, and third MCSs with the data rates for others of the first, second, and third MCSs;
means for determining, based on the comparison, which of the MU-MIMO, SU-MIMO, or open loop communication modes is associated with the highest data rate among the respective data rates; and
means for selecting one of the MU-MIMO, SU-MIMO, or open loop communication modes for transmitting data to the STA based at least in part on which of the MU-MIMO, SU-MIMO, or open loop communication modes is associated with the highest data rate.

22. The communications device of claim 21, wherein the means for selecting one of the MU-MIMO, SU-MIMO, or open loop communication modes is to:
select the SU-MIMO mode if the data rate for the second MCS is higher than the data rate for the first MCS.

23. The communications device of claim 21, wherein the means for selecting one of the MU-MIMO, SU-MIMO, or open loop communication modes is to:
select the open-loop mode if the data rate for the third MCS is equal to or higher than the data rate for at least one of the second MCS for or the first MCS.

24. The communications device of claim 21, wherein the means for determining at least one of the first MCS or the second MCS is to:
generate a stacked channel estimation based at least in part on channel state information received from the STA;
determine squared singular values for each data tone of the stacked channel estimation;
calculate a channel capacity based at least in part on the squared singular values;
determine a number of achievable bits per subcarrier based at least in part on the channel capacity; and
determine the first MCS or the second MCS based at least in part on the number of achievable bits per subcarrier.

25. The communications device of claim 21, wherein the means for determining the third MCS is to:
generate a stacked channel estimation based at least in part on channel state information received from the STA;
calculate an equivalent open loop channel by applying a cyclic delay to the stacked channel estimation;
determine squared singular values for each data tone of the equivalent open loop channel;
calculate a channel capacity based at least in part on the squared singular values;
determine a number of achievable bits per subcarrier based at least in part on the channel capacity; and
determine the third MCS based at least in part on the number of achievable bits per subcarrier.

26. The communications device of claim 21, wherein the means for selecting one of the MU-MIMO, SU-MIMO, or open loop communication modes is to:
select one of the MU-MIMO, SU-MIMO, or open loop modes based, at least in part, on a distance between the communications device and the STA.

27. The communications device of claim 26, wherein the means for selecting one of the MU-MIMO, SU-MIMO, or open loop communication modes is to further:

select the open-loop mode if the distance between the communications device and the STA exceeds a threshold distance; and
select one of the SU-MIMO mode or the MU-MIMO mode if the distance between the communications device and the STA is less than or equal to the threshold distance.

28. The communications device of claim 21, further comprising:
means for determining a Doppler level of the STA based at least in part on channel state information received from the STA; and
means for selecting one of the MU-MIMO, SU-MIMO, or open loop modes based, at least in part, on the Doppler level of the STA.

29. The communications device of claim 28, wherein the means for selecting one of the MU-MIMO, SU-MIMO, or open loop modes based, at least in part, on the Doppler level of the STA is to:
select the open-loop mode if the Doppler level of the STA exceeds a threshold level; and
select one of the SU-MIMO mode or the MU-MIMO mode if the Doppler level of the STA is less than or equal to the threshold level.

30. A non-transitory computer-readable storage medium storing instructions that, when executed by a processor of a communications device, causes the communications device to:
determine a first a modulation coding scheme (MCS) to be implemented for transmitting data to a station (STA) when operating in a multiple-user multiple-input multiple-output (MU-MIMO) mode;
determine a second MCS to be implemented for transmitting data to the STA when operating in a single-user multiple-input multiple-output (SU-MIMO) mode;
determine a third MCS to be implemented for transmitting data to the STA when operating in an open loop mode;
compare respective data rates for each of the first, second, and third MCSs with the data rates for others of the first, second, and third MCSs;
determine, based on the comparison, which of the MU-MIMO, SU-MIMO, or open loop communication modes is associated with the highest data rate among the respective data rates; and
select one of the MU-MIMO, SU-MIMO, or open loop communication modes for transmitting data to the STA based at least in part on which of the MU-MIMO, SU-MIMO, or open loop communication modes is associated with the highest data rate.

* * * * *